United States Patent [19]
Gold et al.

[11] Patent Number: 5,801,937
[45] Date of Patent: Sep. 1, 1998

[54] UNINTERRUPTIBLE POWER SUPPLIES HAVING COOLED COMPONENTS

[75] Inventors: Calman Gold, Londonderry, N.H.; Richard J. Gran, Northborough, Mass.

[73] Assignee: American Superconductor Corporation, Westborough, Mass.

[21] Appl. No.: 732,029

[22] Filed: Oct. 16, 1996

[51] Int. Cl.⁶ ............................................ H02M 1/10
[52] U.S. Cl. .................................... 363/141; 307/66
[58] Field of Search .................... 363/34, 37, 40, 363/95, 97, 141; 307/46, 48, 64, 66, 85, 86, 87; 252/67, 68

[56] References Cited

U.S. PATENT DOCUMENTS

| | | | |
|---|---|---|---|
| 4,366,389 | 12/1982 | Hussey | 307/66 |
| 4,369,120 | 1/1983 | Stelz et al. | 252/68 |
| 4,436,641 | 3/1984 | Stelz et al. | 252/68 |
| 4,460,834 | 7/1984 | Gottfried | 307/64 |

(List continued on next page.)

FOREIGN PATENT DOCUMENTS

| | | |
|---|---|---|
| 0 419 042 A1 | 3/1991 | European Pat. Off. . |
| 0 419 042 B1 | 3/1991 | European Pat. Off. . |
| 0 492 777 A2 | 7/1992 | European Pat. Off. . |
| 0 492 777 B1 | 7/1992 | European Pat. Off. . |
| 0 507 275 A1 | 10/1992 | European Pat. Off. . |
| 0 516 093 B1 | 12/1992 | European Pat. Off. . |
| 0 552 075 A1 | 7/1993 | European Pat. Off. . |
| 0 552 075 B1 | 7/1993 | European Pat. Off. . |
| 0 564 653 A1 | 10/1993 | European Pat. Off. . |
| 0 565 265 A1 | 10/1993 | European Pat. Off. . |
| 0 568 115 B1 | 11/1993 | European Pat. Off. . |
| 0 621 328 A1 | 10/1994 | European Pat. Off. . |
| 0 632 002 A1 | 1/1995 | European Pat. Off. . |
| 0 565 265 B1 | 10/1995 | European Pat. Off. . |
| 0 676 459 A1 | 10/1995 | European Pat. Off. . |
| 0 676 460 A1 | 10/1995 | European Pat. Off. . |

OTHER PUBLICATIONS

York, "Heating Cryogenic Helium with a Solid Propellant Gas Generator", pp. 759–766, Proc. of the 1983 Cryogenic Eng. Conf., Colorado Springs, CO., (Aug. 15–17, 1983), Advances in Cryogenic Engineering, vol. 29, Fast, Ed., (1984).
Barron, "Cryogenic Systems", Oxford Univ. Press, New York, Clarendon Press, Oxford, pp. 150–237, 356–429 (1985).
Bell, Jr., "Cryogenic Engineering", Prentice–Hall, Inc., Englewood Cliffs, N.J., pp. 276–311 (1963).
Timmerhaus et al., "Cryogenic Process Engineering", Plenum Press, NY & London, pp. 1–9, 407–421 (1989).

Primary Examiner—Peter S. Wong
Assistant Examiner—Y. J. Han
Attorney, Agent, or Firm—Choate, Hall & Stewart

[57] ABSTRACT

Methods and apparatus for uninterruptible power supply (UPS) systems are provided. The UPS systems are configured to provide the advantages of an in-line device, and operate in a quasi-standby mode. The UPS includes a rectifier unit and inverter arranged to nominally deliver a portion (e.g. up to about 20%) of the primary AC power supply to a critical load through an output transformer. The rectifier unit preferably includes internal energy storage capabilities, such as a capacitor and inductor. The remaining portion of the AC power supply is nominally supplied directly to the critical load and is controlled by a transfer switch and the output transformer. When a fault is detected in the main AC power supply, the transfer switch switches to a faulted position and power is supplied from the rectifier inductor and capacitor or from a battery to the load through the inverter. Electronic switches such as MOSFETs are provided in the system to control the supply of power from the battery (or other energy storage device) to the inverter and to control the charging and discharging of the battery. The inverter and MOSFETs are designed to withstand transient overpower and overcurrent operation without deleterious consequences by liquid cooling the inverter or the inverter and the MOSFETs under predetermined conditions to temperatures between about 60 K and 270 K.

61 Claims, 6 Drawing Sheets

OTHER PUBLICATIONS

| | | | |
|---|---|---|---|
| 4,465,943 | 8/1984 | Risberg | 307/67 |
| 4,473,756 | 9/1984 | Brigden et al. | 307/66 |
| 4,484,084 | 11/1984 | Cheffer | 307/64 |
| 4,488,057 | 12/1984 | Clarke | 307/66 |
| 4,673,825 | 6/1987 | Raddi et al. | 307/66 |
| 4,675,538 | 6/1987 | Epstein | 307/64 |
| 4,827,152 | 5/1989 | Farkas | 307/68 |
| 4,939,633 | 7/1990 | Rhodes et al. | 363/98 |
| 5,053,635 | 10/1991 | West | 307/67 |
| 5,057,697 | 10/1991 | Hammond et al. | 307/66 |
| 5,108,637 | 4/1992 | Pearson | 252/67 |
| 5,126,585 | 6/1992 | Boys | 307/66 |
| 5,172,009 | 12/1992 | Mohan | 307/46 |
| 5,210,685 | 5/1993 | Rosa | 363/109 |
| 5,220,492 | 6/1993 | Rubin et al. | 363/21 |
| 5,229,650 | 7/1993 | Kita et al. | 363/37 X |
| 5,236,611 | 8/1993 | Shiflett | 252/67 |
| 5,248,433 | 9/1993 | Felix et al. | 252/67 |
| 5,254,279 | 10/1993 | Takemasa et al. | 252/67 |
| 5,277,834 | 1/1994 | Bivens et al. | 252/67 |
| 5,307,641 | 5/1994 | Kooy | 62/59 |
| 5,315,533 | 5/1994 | Stich et al. | 364/480 |
| 5,334,877 | 8/1994 | Mohan et al. | 307/46 |
| 5,347,168 | 9/1994 | Russo | 307/245 |
| 5,465,011 | 11/1995 | Miller et al. | 363/34 X |
| 5,474,695 | 12/1995 | Macaudiere et al. | 252/67 |
| 5,625,548 | 4/1997 | Gold et al. | 363/98 |

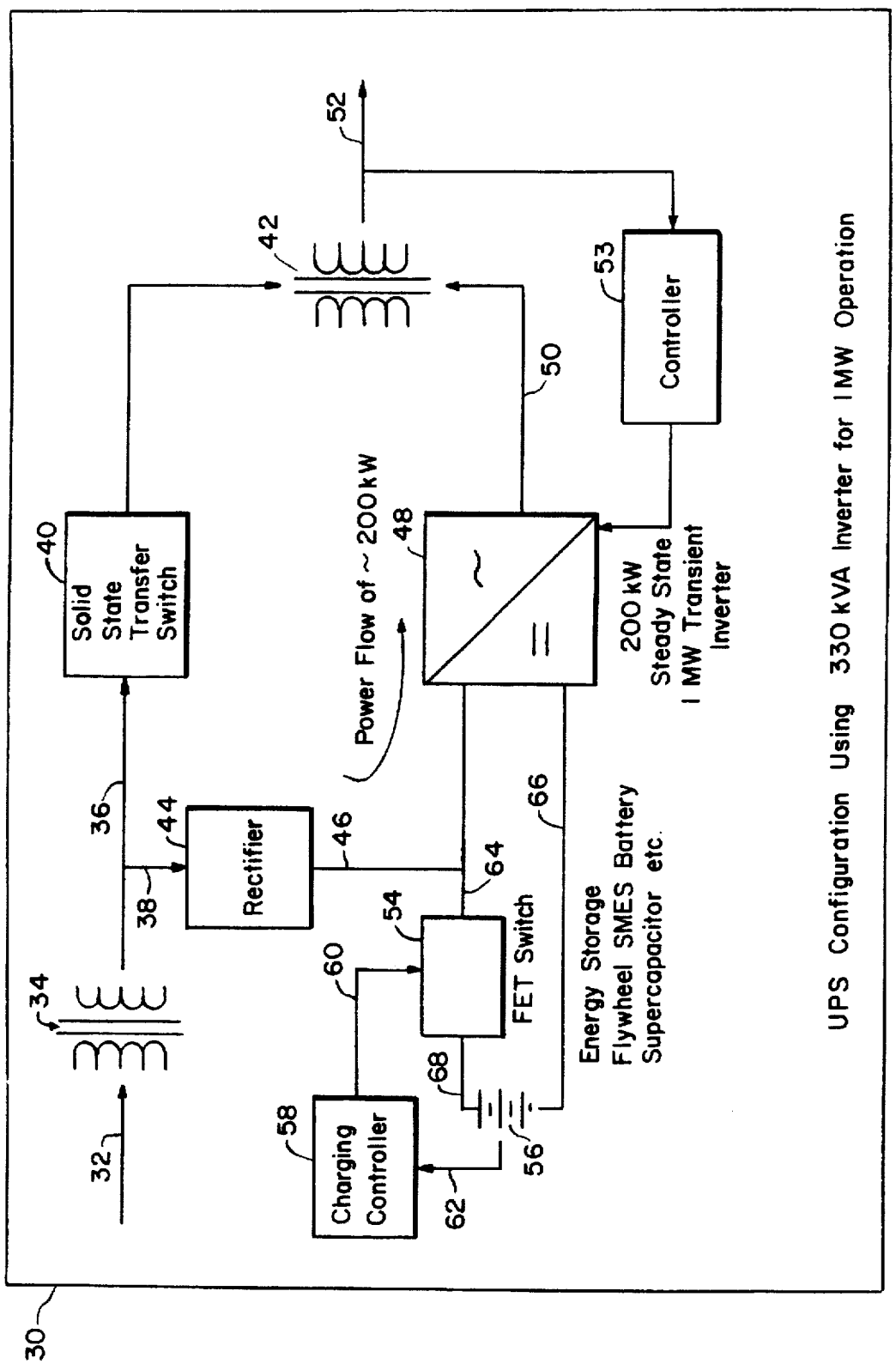

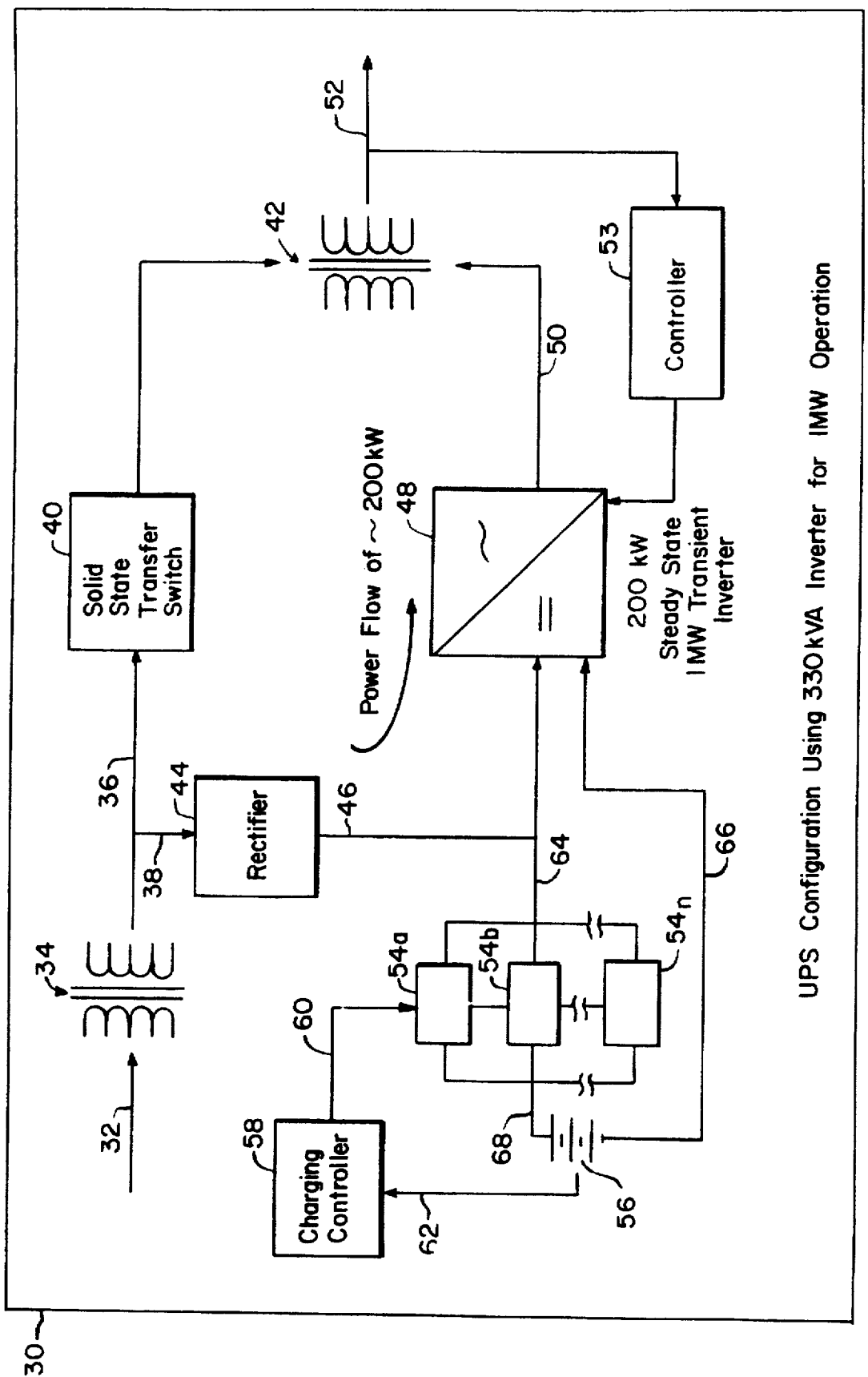
FIG. 2B  UPS Configuration Using 330kVA Inverter for 1MW Operation

Inverter Connected in Series with the Line to Provide Voltage Make-Up

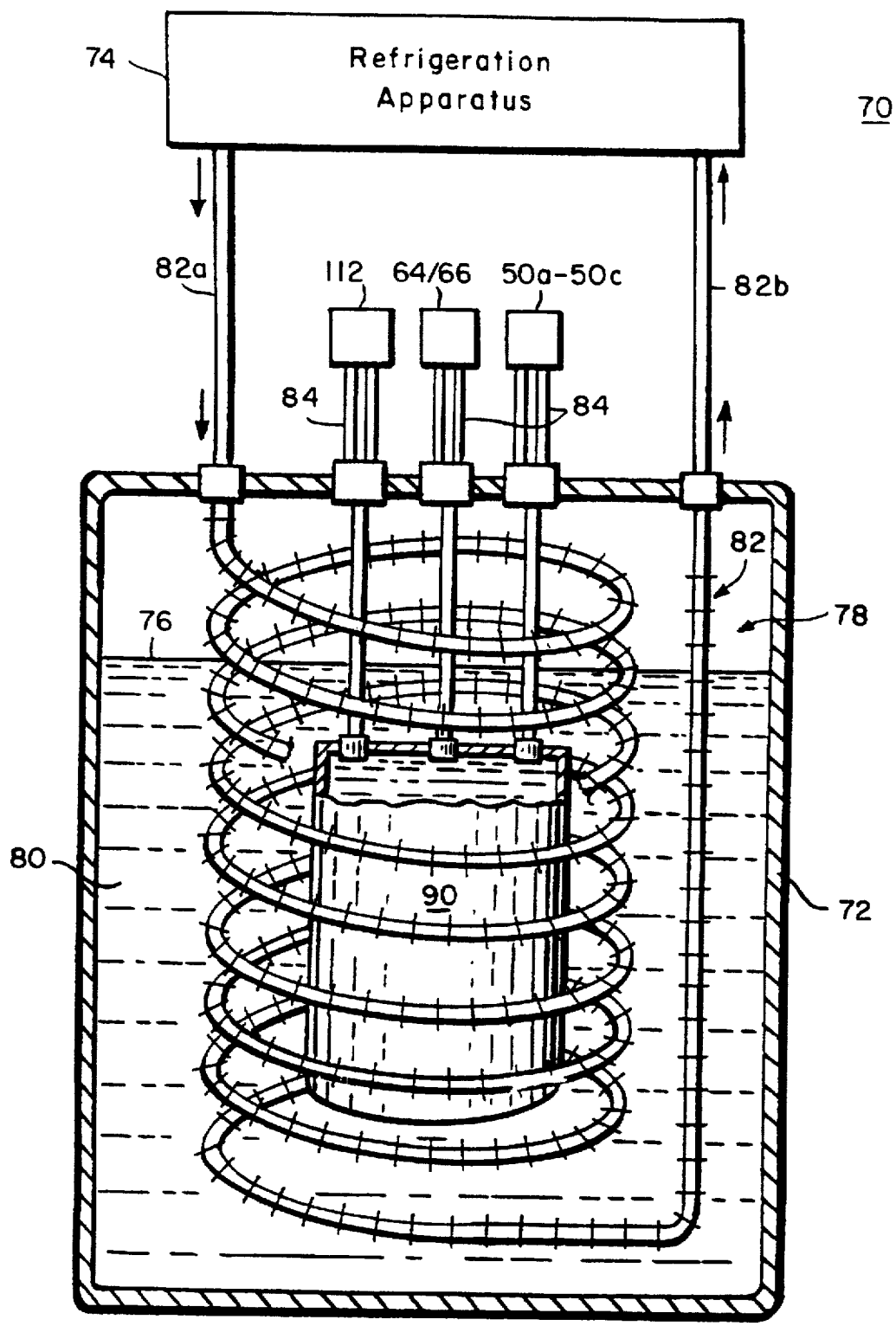
F I G. 5

UNINTERRUPTIBLE POWER SUPPLIES HAVING COOLED COMPONENTS

TECHNICAL FIELD

The present invention generally relates to uninterruptible power supply (UPS) systems. The invention more particularly relates to methods and apparatus for cooling components of UPS systems under conditions that allow overcurrent and overpower transient operation of such components without deleterious consequences.

BACKGROUND OF THE INVENTION

Certain critical loads require an uninterrupted or virtually uninterrupted power supply. For example, computers, communication equipment, medical equipment and some critical factory processes require virtually uninterrupted electrical power supplies in order to avoid losing data, time, material and the like. Such losses can have catastrophic consequences. Continuity of electrical power for many applications is therefore critical. In order to accommodate such equipment, it is common to utilize an uninterruptible power system (UPS) (also known as an uninterruptible power supply (UPS) system). UPS systems are designed to supply electrical power to certain critical loads when the main source of power fails (e.g. during a blackout or power outage). These systems can also be configured to provide power during brownouts, i.e. periods of inadequate capacity and increased load demands that result in a drop in the magnitude of the available voltage.

More specifically, uninterruptible power supply (UPS) systems provide interfaces between utility power system inputs and critical loads. Such critical loads normally receive AC power and as mentioned above, include for example computers, communication equipment, medical equipment and the like. UPS systems, called "in-line systems", typically rectify AC power from a utility such that a portion of the rectified power is utilized to charge a battery while another portion of the rectified power is provided to the critical load. The latter is accomplished by employing an inverter, which converts DC voltage into an AC output at the typical power line voltage and frequency (e.g. 60 Hz and 120 Volts rms in the United States). When a power outage occurs, power is supplied to the critical load from the battery through the inverter. In this manner, the loss of valuable information and the like due to power interruption is avoided. Likewise, critical manufacturing processes can continue to be performed during power outages.

UPS systems can also provide line power conditioning for the utility power system inputs. For example, the conditioning can be designed to reduce the effect of transient spikes, low voltage conditions, and/or distorted power waveforms on the operation of the critical load. Such conditioning can be accomplished through the normal operation of the UPS.

An alternative to or variation of the "in-line" UPS system is the standby power supply (SPS) system (i.e. an off-line system). SPS systems are utilized under normal conditions to provide AC power directly from a utility to a critical load. When a power outage occurs, power is supplied to the critical load from a battery through an inverter. SPS systems (and back-up power supplies) generally differ from UPS systems in that SPS systems (and back-up power supplies) cause a disruption of a few seconds before the alternate source of power begins. Usually, load transfer can occur through the use of a transfer switch apparatus. In this manner, the load can be coupled to the primary AC supply or to the UPS or SPS system. It is important that the transfer switch apparatus be capable of rapid response. In many instances, disruptions exceeding a fraction of an AC cycle are intolerable. In addition, the quality of the voltage provided by the UPS or SPS should be comparable to or exceed that of the primary power source.

As mentioned above, the transfer time during switching of single conversion or SPS systems (or off-line systems) can be noticeable and become significant in some critical load applications. Double conversion or in-line configurations eliminate this transfer time since the AC source voltage is continuously converted by a rectifier to a DC voltage and charges a battery that is in parallel with the DC voltage. This DC voltage is converted by an inverter back into AC output voltage. If the AC source voltage is lost, the battery supplies the DC voltage to the inverter immediately and there is no loss or interruption of power to the load. When the AC source voltage is restored, the load is again supplied from the AC source without interruption of power.

One disadvantage associated with prior art UPS systems is inadequate protection of solid state output devices. Typical power inverters in prior art systems are convection cooled by air at room temperature. The semiconductor devices operate at higher temperatures, typically at about 100° C. When the power and current ratings are exceeded, the temperature of the device rapidly increases and a rapid "thermal runaway" ensues, leading to device destruction. Consequently, failures of the devices due to overloads, short circuits and overheating occur. For example, inverters in many prior art systems have been deficient in handling load change demands. As a result, overcurrent, short circuits, and/or in-rush current conditions occur when unusual load demands are placed on the inverter portion of the UPS.

Another disadvantage associated with prior UPS systems is that portions of the backup system must be capable of providing the full source of power even though the backup system is intended only to be employed for brief periods of time (e.g. during an outage). For example, a 1 MW UPS system previously has required the use of a 1 MW inverter in order to ensure that sufficient power can be delivered through the inverter during outages and brownouts. Inverters having such ratings can significantly add to the cost of manufacture.

Still another disadvantage associated with prior art systems is that the battery is typically connected to the inverter during normal operation. As a result, short transients cause the battery to be repeatedly charged and discharged, thereby significantly reducing the length of the life of the battery.

In the context of uninterruptible power supply systems, it would therefore be desirable to provide methods and apparatus for improving the supply of power which reduces or eliminates these and other disadvantages, thereby overcoming the shortcomings associated with the prior art.

SUMMARY OF THE INVENTION

The present invention provides UPS systems that can utilize components having lower ratings than system requirements, yet maintain desired outputs to critical loads. For example, the present invention provides methods and apparatus for UPS systems that utilize an inverter cooled in a liquid such that the inverter that can be operated with large overcurrent and overpower under predetermined conditions without deleterious consequences. The systems provided by the present invention operate in a quasi-standby mode of operation, but have the characteristics of an in-line device.

The UPS systems of the present invention can be cost effectively produced. In addition, the systems can provide input and output power quality, extend battery life and prevent transients on the line from being seen by the load.

These and other objects of the invention are provided by methods and apparatus that result from the large available current and power margin in uniquely designed UPS systems. As discussed above, typical power inverters in prior art systems are convection cooled by air at room temperature. The semiconductor devices operate at higher temperatures, typically at about 100° C. When the power and current ratings are exceeded, the temperature of the device rapidly increases and a rapid "thermal runaway" ensues, leading to device destruction. Attempts to utilize room temperature liquids (e.g. oil) often fail because the temperature of the device(s) is too close to its failure temperature. Consequently, there is little or no margin for the temperature of the device to increase and then transfer heat to the room temperature liquid prior to failure.

In contrast, the present invention employs cooling liquids that act as a thermal mass and provide rapid heat transfer. More specifically, the present invention provides system configurations that allow portions of the UPS system to be cooled to temperatures below 270 K, and preferably between 60 K–270 K. The net effect of the large operating margins built into the system design and the fact that the devices are not operated at room temperature allows transient operation of an inverter/converter exceeding its rated current and power capabilities. In addition, other portions of the system (such as electronic switches) that are similarly cooled can be operated under conditions exceeding their respective ratings.

The present invention thus utilizes attributes of power electronics that are cooled by being immersed in a cooling liquid. The heat transfer from the power device being cooled to the liquid is enhanced by local boiling of the liquid, and the liquid provides a large thermal capacity. The combination of these two physical properties allows the power electronics to have a significantly higher effective rating than would be possible when the devices are convection cooled by air flow at room temperature. The present invention therefore utilizes power electronics cooled to temperatures below 270 K, and preferably between 60 K and 270 K to invert power from DC to AC for use as a UPS.

The UPS systems in accordance with the present invention operate in a quasi-standby mode, i. e. the inverter is designed to nominally provide a portion of the power to the load. For example and while not to be construed as limiting, the power provided to the load from the inverter under steady state conditions does not exceed about 50% of the total power, and more preferably does not exceed about 20% of the total power to the load. The inverter is also designed and configured to operate in a standby mode in the event of power outage or the like. Under these circumstances, the full power to the load is supplied from the inverter. For example, a 1 MW system in accordance with the present invention can be designed such that the inverter would nominally provide power flow of about 200 kW to overcome transients and to provide good power quality at the output. The remainder of the 1 MW of power (800 kW) would be provided by the line through a power transfer switch and an output transformer. The transfer switch could be a solid state device that operates rapidly (e.g. in less than ⅛ of a cycle or about 2 ms). Thus, through the nominal path, line voltage integrity could be maintained through any transients whose duration is less than ⅛ of a cycle. If a longer transient were to occur, the transfer switch could be activated.

During the time required for the transfer switch to open, the inverter could use power stored in a rectifier unit that includes an inductor and capacitor to provide the full 1 MW of power. Because the line is going down, and an energy storage device (e.g. battery) will be providing primary power as soon as the transfer switch is open, the rectifier power can be drained down almost completely. When the voltage of the rectifier unit is less than the voltage of the energy storage device, an electronic switch (e.g MOSFET) in series with the energy storage device starts to conduct and the energy storage device supplies the requisite power. When the transfer switch opens (typically in less than a cycle), the power is thus provided by the energy storage device and the inverter. The inverter, which typically has a power rating less than that of the total power to be delivered by the system, is clearly being over driven during this period (from the start of the fault until the battery power is drained, until power is restored or until a back-up generator or the like is in use. For example, a back-up or auxiary generator can be started in about 30 seconds.).

The inverter is capable of being over driven by cooling the inverter or both the inverter and battery charging electronic switch(es) with the inverter. As discussed herein for example, a power electronic inverter/converter built using paralleled MOSFETs as components of the inverter can have the current in each FET reduced by 1/N where N is the number of MOSFETs in parallel. Because each FET has a current that is 1/N times the total current delivered, the conduction loss in each FET is reduced by $1/N^2$. In the specific case of MOSFETs, cooling enables a substantial reduction of on-resistance and hence power dissipation. This reduction in power dissipation is important to limit the total cooling needed, and to ensure that the total cooling cost does not overwhelm the system. The amount of time that the inverter is being overdriven is the same as or less than the time required for the battery to discharge (or the time required for power to be restored or for a back-up generator to be in use). This amount of time is made possible by the combined effects of the cryogenic cooling, the heat capacity of the cooling liquid and the boiling heat transfer; all of which ensure that the inverter does not overheat. Consequently, the UPS systems in accordance with the present invention have the advantages of an in-line device, notwithstanding that it operates in a quasi-standby mode. In addition, an inverter that has a significantly lower rating than that to be delivered by the system during nominal conditions is used to provide the required power conversion, thereby increasing system efficiency. In addition, the cost and physical size of the overall system is reduced.

The battery charging electronic switches (e.g. MOSFETs) in series with the battery could also be cooled. This permits transient operation of the MOSFETs (or other electronic switches) to much higher current than their ratings. In addition, an electronic switch or switches such as MOSFETs can be configured to control the charging and discharging of the battery in a carefully controlled manner. The MOSFETs also can be configured to disconnect the battery from the inverter during nominal operation so that short transients would not cause the battery to be discharged, thereby overcoming a cause of short battery life in prior systems. In addition, both the inductor and capacitor in the rectifier unit provide energy storage capabilities needed to avoid battery use during transient time periods.

The present invention thus provides an inverter designed to provide both voltage makeup (when the line voltage is low) and also provide the required output voltage when the line is down. In preferred embodiments, the steady state power flowing through the inverter does not exceed about 50% of the total power to the load, and more preferably does not exceed about 20% of the total power provided by the line to the load. Transients on the line are preferably not be seen by the load. Load transfer is designed to occur so that there is sufficient time to change from the "in-line operation" to operation using the battery or other energy storage device.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIGS. 2A–2B illustrate schematic diagrams of systems suitable for use in accordance with the present invention;

FIG. 5 illustrates a portion of the systems shown in FIGS. 2 and 3 contained within a liquid cooled environment.

Similar reference characters refer to similar parts throughout the several views of the drawings.

DETAILED DESCRIPTION OF THE PREFERRED EMBODIMENTS

Figure 1:
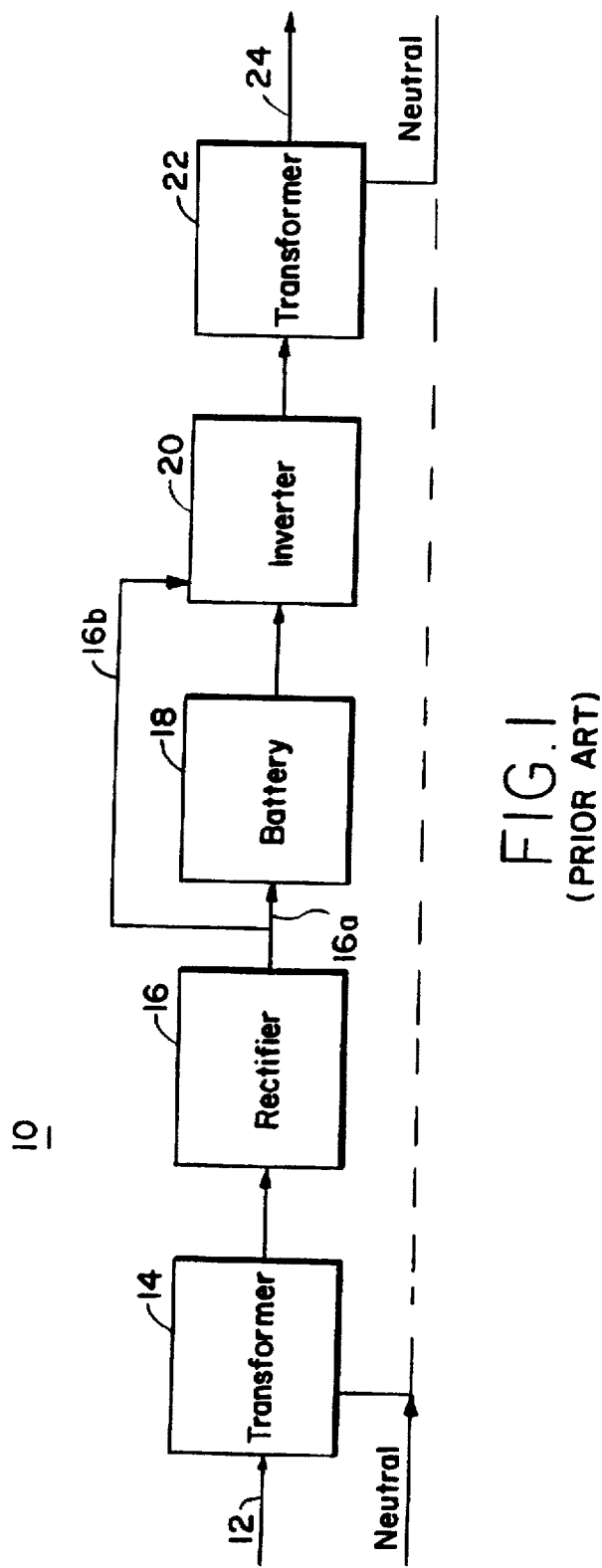
FIG. 1 illustrates a schematic diagram of a conventional UPS system.

FIG. 1 illustrates a schematic diagram of a conventional UPS system 10. Input power 12 from an AC supply is transformed in transformer 14 and rectified in rectifier 16. A portion of the rectified power 16a is used to charge battery 18 (which sometimes supplies a constant source of power such that it is repeatedly charged-discharged) while another portion of the rectified power 16b is supplied to inverter 20 and is therein converted to AC voltage for load 24 (through transformer 22). When a power outage or blackout occurs, power from battery 18 is used to provide an output from inverter 20 to supply the load 24 through transformer 22. In this manner, there is no disruption of power being supplied to load 24. Various UPS and SPS systems are known. See e.g. U.S. Pat. Nos. 5,334,877 to Mohan et al.; 4,827,152 to Farkas; 5,315,533 to Stich et al.; 5,229,650 to Kita et al.; 5,220,492 to Rubin et al.; 5,210,685 to Rosa; 5,172,009 to Mohan; 5,126,585 to Boys: John; 5,057,697 to Hammond et al.; 5,053,635 to West; 4,939,633 to Rhodes et al.; 5,465,011 to Miller et al.; 4,675,538 to Epstein; 4,673,825 to Raddi et al.; 4,488,057 to Clarke; 4,484,084 to Cheffer; 4,366,389 to Hussey; 4,465,943 to Risberg; and 4,460,834 to Gottfried, all of which are incorporated herein by reference.

Load transfer using prior UPS systems can be accomplished through the use of a transfer switch apparatus (not shown in FIG. 1). In this manner, the load can be coupled to the primary AC supply or to the UPS system. The use of MOSFETs in a switching circuit in a power supply can be used for switching between a main power source and a standby power source. See e.g., U.S. Pat. No. 4,484,084, the contents of which are incorporated herein by reference.

UPS systems such as those shown in FIG. 1 typically require that the battery be discharged and recharged in accordance with the use of the UPS system. For example, the batteries used in prior art systems are frequently charged and discharged during nominal operation because a portion of the power supplied to the inverter is supplied from the battery. Moreover, because the battery is typically connected to the inverter during nominal operation, short transients cause the battery to be discharged. As a result, premature deterioration of the battery often occurs, thereby decreasing the life of the battery.

Additionally, UPS systems in accordance with the prior art have required the use of an inverter that is rated to deliver the total amount of steady state power. For example, prior art systems designed to deliver 1 MW power have required components in the inverter that can deliver the full 1 MW. Otherwise, such systems would overheat as a result of the inverter (and components) being overdriven. Such systems are expensive to manufacture. The present invention overcomes this and other shortcomings of such systems by allowing transient operation of an inverter at a power level over that for which the inverter is rated. In addition, the deterioration of the battery is reduced because an electronic (e.g. MOSFET) switch or switches can be configured to disconnect the battery from the inverter during nominal operation.

A schematic diagram of an uninterruptible power supply system in accordance with the present invention is shown in FIG. 2A. System 30 includes an AC source 32, typically from a utility. AC power 32 flows through input transformer 34 and a portion of the power 36 is nominally supplied to load 52 through output transformer 42. As discussed in greater detail herein, the flow of power 36 is controlled by transfer switch 40.

Another portion of AC power 38 is rectified in rectifier unit 44 and the rectified DC power 46 is supplied to inverter 48. Inverter 48 converts the DC power 46 to AC power 50, which is supplied to load 52 through output transformer 42. Output power quality is controlled by controller 53. More particularly, controller 53 compares a reference voltage to the voltage being supplied to load 52 from inverter 48. Adjustments in power or frequency supplied by inverter 48 can thus be provided as desired or as necessary.

In preferred embodiments, the power flow 38 nominally does not exceed some percentage (typically about 20%) of the total power being supplied to the load. As discussed herein (see e.g. Example 1), if the supply of power 32 is 1 MW, approximately 200 kW is nominally supplied to load 52 through inverter 48, while the remaining 800 kW is nominally supplied to load 52 directly as AC power 36 through the power transfer switch 40 and the output transformer 42.

Transfer switch 40 could be a solid state device that operates rapidly (e.g. in less than ⅛ of a cycle or about 2 ms). For example, transfer switch 40 could be two IGBTs (insulated-gate bipolar transistors) connected in inverse parallel direction (for bidirectional conduction). It will be appreciated, however, that other solid state transfer switch (es) can be employed in accordance with the present invention. For example, MOSFETs can be utilized as transfer switch 40. In addition, FREDFETs (Fast Recovery Epitaxial Diode Field Effect Transistors) available for example from SIEMENS or Advanced Power Technology, HiPerFET™s (FETs with a fast intrinsic diode, available from IXYS Corporation) or the like can be used as transfer switch 40. Power 50 supplied by inverter 48 is designed to overcome transients and to provide good power quality (PQ) at the output (utilizing controller 53). Thus, through the nominal path, line voltage integrity could be maintained through any transients whose duration is less than 1/8 of a cycle. If a longer transient were to occur, the transfer switch 40 could be activated.

The embodiment illustrated in FIG. 2A provides a UPS system that allows large available current and power margin operation. Typical power inverters in prior art systems are convection cooled by air at room temperature. The semiconductor devices operate at higher temperatures, typically at about 100° C. When the power and current ratings are exceeded, the temperature of the device rapidly increases and a rapid "thermal runaway" ensues, leading to device destruction. In contrast, the present invention employs cooling liquids that act as thermal mass and provide rapid heat transfer. More specifically, the present invention provides system configurations that allow the power electronics to be cooled to temperatures between 60 K and 270 K. As used herein, a "cooling liquid" or "cryogen" refers to a cooling medium that can maintain a portion or portions of a UPS system immersed therein with a temperature range between about 60 K and 270 K.

The net effect of the large operating margins built into the design and the fact that the devices are not operated at room temperature allows operation of an inverter/converter with large over current and power. In addition, other portions of the UPS system that are similarly cooled can be operated under conditions exceeding their respective ratings.

The UPS systems in accordance with the present invention operate in a quasi-standby mode, i.e. the inverter is designed to nominally provide a portion of the power to the load (e.g. up to about 20% of the total power supplied by the utility). The inverter is also designed and configured to provide uninterrupted power in the event of power outage or the like. Under these circumstances, the full power to the load is supplied through the inverter.

Figure 4:
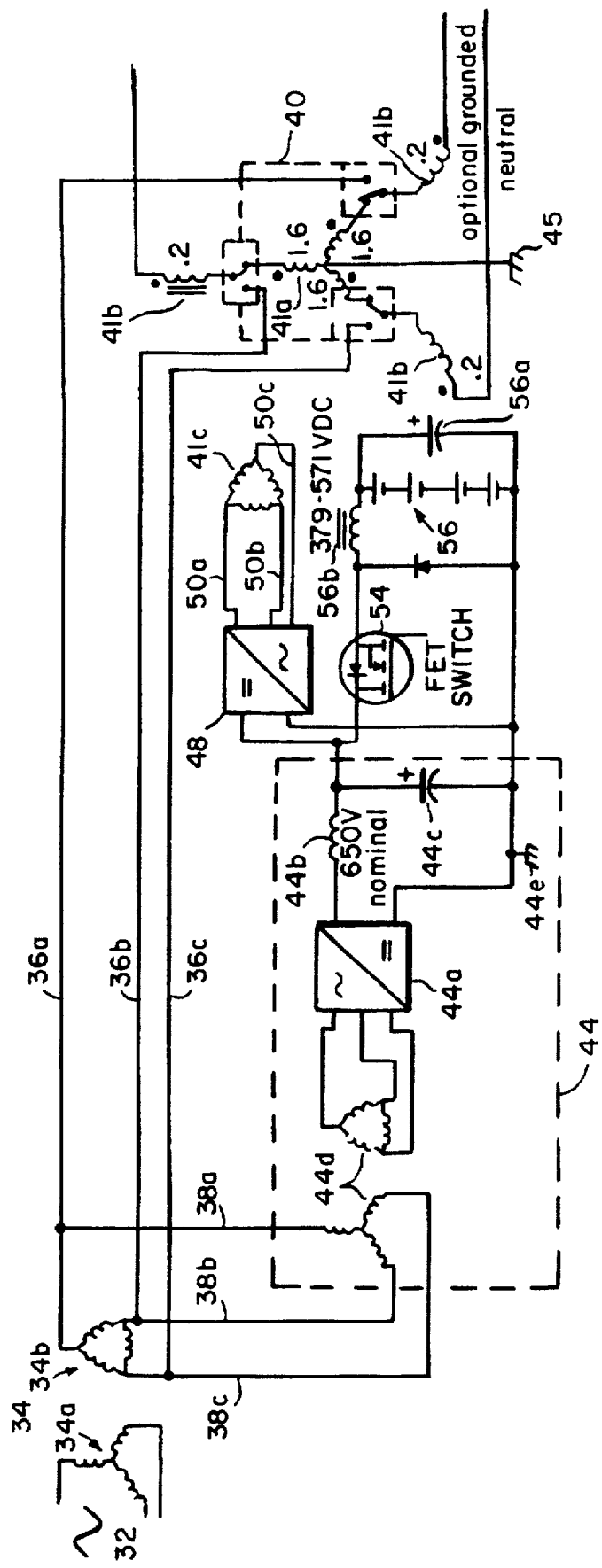
FIG. 4 illustrates additional details of a transfer switch and transformer connections suitable for use in accordance with the present invention.

Rectifier unit 44 includes internal energy storage capabilities, such as for example at least one capacitor and at least one inductor (see FIG. 4). Both the inductor and capacitor in the rectifier unit provide energy storage capabilities needed to avoid battery use during transient time periods.

During the time required for the transfer switch 40 to open, the inverter 48 could use power stored in the rectifier unit inductor and capacitor to provide the full 1 MW of power. Because the line is going down, and energy storage device 56 will be providing primary power as soon as the transfer switch 40 is open, the rectifier unit power 44 can be drained down almost completely. Battery charging electronic switch(es) 54 is connected to rectifier unit 44 via connection 64 and connected to energy storage device 56 via connection 68. When the voltage of the rectifier unit 44 is less than voltage of the energy storage device 56, the electronic switch 54 (or battery charging electronic switches 54a-54n, as shown in FIG. 2B) in series with the energy storage device 56 starts to conduct and the energy storage device 56 supplies the requisite power to inverter 48 through connection 66.

The inverter is designed to provide both voltage makeup (when the line voltage is low) and also provide the required output voltage when the line is down. The inverter includes MOSFET switch(es) components or other similar components. While not meant to be limiting, the inverter typically is polyphase (e.g. 3 phases). In addition, the total steady state power flowing through the inverter preferably does not exceed 20% of the total power provided by the line. Transients on the line should not be seen by the load. Load transfer is designed to occur so that there is sufficient time to change from the in-line operation to operation using the battery.

Energy storage device 56 thus is configured to provide power to inverter 48 when the voltage of the rectifier unit 44 is less than the voltage of the energy storage device 56. Energy storage device 56 can be a battery or the like. It will be appreciated by those skilled in the art, however, that alternative energy storage devices can be used in accordance with the present invention. For example and while not to be construed as limiting, alternative energy storage devices such as flywheels, SMES (superconducting magnetic energy storage) devices with appropriate cooling capabilities, supercapacitors or the like could be implemented in system 30. When the transfer switch 40 opens (typically in less than a cycle), the power is provided by the energy storage device 56 and the inverter 48. The inverter 48 is being over driven during this period (from the start of the fault until the battery power is drained).

Battery charging electronic switch 54 can be a MOSFET (s) (metal oxide semiconductor field effect transistors). MOSFETs are used as switches in electronic circuits. MOSFETs, which can be turned "on" to pass electrical currents and "off" to stop those currents, are controlled electrically and operate extremely rapidly. Thus, MOSFETs can be ideal for use in high-speed switching applications, such as power electronics, where current flows are sometimes started and stopped millions of times per second. As with most electrical devices, MOSFETs are constrained to operate within specific power, temperature and switching ranges. For example, a MOSFET that is operating at room temperature, with a gate-to-source voltage of 15 volts, and a switching rate of 10,000 cycles/sec, may be limited to passing currents on the order of 10 amps. Though the so-called safe operating areas (SOAs) of MOSFETs are well known, it is often difficult to ensure that the SOA of a given MOSFET will not be exceeded, at least momentarily, during circuit operation. This is particularly true where a MOSFET is operated close to the limits of its SOA. In the present invention, the cooling of the MOSFETs is accomplished through immersion in a cryogenic liquid. This permits transient operation of the MOSFETs to much higher currents than their rating (for example, a liquid cooled 20 amp rated MOSFET has been operated with 80 amps rms without overheating).

In contrast to prior art systems, the inverter 48 can be overdriven without causing a corresponding thermal runaway because of the cooling of the inverter 48 or the inverter 48 and the battery charging MOSFETs 54 with the inverter (see FIG. 5). The embodiment shown in FIG. 2B is similar to that illustrated in FIG. 2A, except that a plurality of paralleled battery charging MOSFETs 54a-54n are connected in series to battery 48.

A power electronic inverter/converter built using paralleled MOSFETs as components of the inverter can have the current in each inverter MOSFET reduced by 1/N where N is the number of inverter MOSFETs in parallel. Because each inverter FET has a current that is 1/N times the total current delivered, the conduction loss in each inverter FET is reduced by $1/N^2$. In the specific case of MOSFETs, cooling enables a substantial reduction of its on-resistance with a corresponding reduction in power loss. This reduction in power dissipation is important to limit the total cooling needed, and to ensure that the total cooling cost does not overwhelm the system. The amount of time that the inverter is being overdriven is the same as or less than the time required for the battery to be drained (or the time for power to be restored or for a back-up generator to be in use). This amount of time is made possible by the combined effects of the cryogenic cooling, the heat capacity of the cooling liquid and the boiling heat transfer; all of which ensure that the inverter does not overheat. Consequently, the UPS system in accordance with the present invention has the advantages of an in-line device, notwithstanding that it nominally operates in a quasi-standby mode. This allows the use of an inverter that has a significantly lower rating relative to inverters used in prior art systems to provide the required power conversion. As a result, the cost and physical size of the overall system could be reduced.

For example, if 10 MOSFETs are in parallel in a 480 volt AC, 100 kW inverter, each FET will only operate with about 8 amps rms of current. The MOSFET, then cooled with liquid nitrogen, can carry 24 amps rms without overheating. Thus, an inverter designed this way will be capable of withstanding 3 times its rated current and power. The FETs can not only operate at this overrating, but as long as the cooling is provided, the FETs can operate at this over rated current continuously.

The battery charging MOSFETs 54a–54n could be cryogenically cooled. Commonly assigned U.S. Pat. No. 5,347,168 to Russo discloses a high performance, cryogenically cooled circuit. The entire circuit, as opposed to for example only the superconducting portions of the circuit, are refrigerated to cryogenic temperatures. In addition to the improved operational characteristics of the superconducting based components, the diodes and the gating elements such as MOSFETs provide a circuit capable of operating a switching power supply at lower frequency using larger inductor values. In addition, those arrangements disclosed in commonly owned copending U.S. application Ser. No. 08/384,780, filed Feb. 6, 1995 may be suitable for use in the invention. The entire contents of U.S. Pat. No. 5,347,168 and U.S. application Ser. No. 08/384,780 are incorporated herein by reference.

Figure 3:
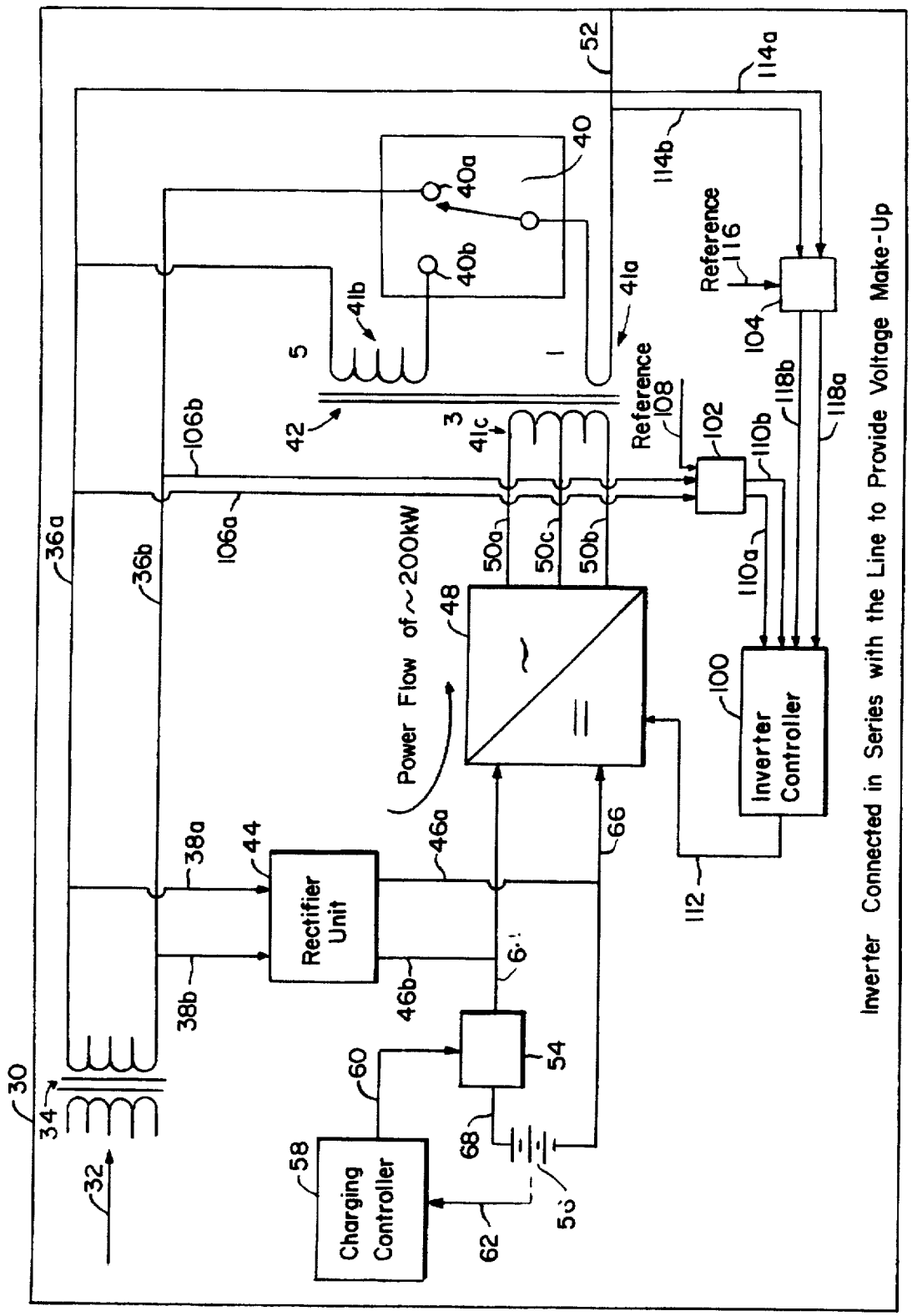
FIG. 3 illustrates details of a transfer switch and transformer connections suitable for use in accordance with the present invention.

Cooling of the battery charging MOSFETs allows the battery to be charged in a predetermined manner. As shown in FIGS. 2–3, charging controller 58 is connected to battery charging electronic switch(es) 54 by connector 60. Charging controller 58 is also connected to energy storage device 56 (e.g. battery) by connection 62. In this manner, battery 56 can be charged by power from rectifier unit 44, which is controlled by controller 58 as desired or as necessary. The MOSFETs can also be configured to allow the battery to be disconnected from the inverter during nominal operation so that short transients would not cause the battery to be discharged, thereby overcoming a cause of short battery life in prior systems.

MOSFET(s) have been discussed herein above to describe the battery charging or the inverter electronic switch or switches suitable for use in accordance with the present invention. It will be appreciated, however, that other electronic switches can be employed in the present invention. For example, under some circumstances, it may desirable to utilize IGBT(s) with a fast recovery diode at temperatures above 230 K. This exploits the heat transfer characteristics of the liquid even though the device performance does not improve due to cooling. Alternatively, it may be desirable to use FREDFET(s) (Fast Recovery Epitaxial Diode Field Effect Transistor) under some circumstances (e.g. when it is desirable for the temperature of the inverter to be above 150 K). FREDFET(s) are available from some transistor manufactures (e.g. SIEMENS, Advanced Power Technology and IXYS).

Referring now to FIG. 3, the details of the transfer switch and transformer connections of the present invention are illustrated. The embodiment shown in FIG. 3 allows the connection of the inverter and the line at the output to be arranged such that the inverter is able to provide both voltage makeup (when the line voltage is low) and is also able to provide the required output voltage when the line is down. In addition, the configuration is designed so that the total steady state power flowing through the inverter preferably does not exceed 20% of the total power provided by the line. As discussed above in connection with FIGS. 2A and 2B, transients on the line preferably are not seen by the load. In addition, load transfer is designed to occur so that there is sufficient time to change from the in-line operation to operation using the battery.

System 30 shown in FIG. 3 includes an AC source 32, typically from a utility. AC power 32 flows through input transformer 34 and a portion of the power 36a, 36b is supplied to load 52 through output transformer 42. As discussed in greater detail herein, the flow of power 36a, 36b is controlled by transfer switch 40.

Another portion of AC power 38a, 38b is rectified in rectifier unit 44 and the rectified DC power 46a, 46b is supplied to inverter 48, by lines 66, 64 respectively. During steady state operation, inverter 48 converts DC power 46a, 46b to AC power 50a, 50b and 50c, which is supplied to load 52 through output transformer 42.

In preferred embodiments, nominal power flow 38a, 38b (and power 50a, 50b and 50c) does not exceed 20% of the total power 32 entering system 30. As discussed herein (see Example 1), if the supply of power 32 is 1 MW, approximately 200 kW is nominally supplied to load 52 through inverter 48, while the remaining 800 kW is nominally supplied to load 52 directly as AC power 36a, 36b through the power transfer switch 40 and the output transformer 42.

Power 50a, 50b and 50c is designed to overcome transients and to provide enhanced power quality (PQ) at the output. Thus, through the nominal path, line voltage integrity could be maintained through any transients whose duration is less than ⅛ of a cycle. If a longer transient were to occur, the transfer switch 40 could be activated.

Transfer switch 40 is shown in FIG. 3 in the nominal (non-fault) state 40a. The transfer switch 40 could be a solid state device that operates rapidly (e.g. in less than ⅛ of a cycle or about 2 ms). The solid state switch could be two IGBTs (insulated-gate bipolar transistor) connected in inverse parallel direction (for bidirectional conduction). Alternatively, switch 40 could be MOSFETs or FREDFETs (either of which may be cooled in accordance with the present invention). When a fault occurs, the transfer switch changes its state to a faulted state 40b, and the output transformer 42 is configured to be a step-up transformer, preferably with a 1:2 (3:6) turns ratio. The step-up voltage ratio accommodates the low battery voltage (e.g. as a 571 volt battery nominally discharges, the voltage drops to about 379 volts; to achieve full 440 volts AC output could require a DC voltage of 650 volts, so the ratio of the battery voltage at the end of discharge to 650 volts is the required step up turns ratio in the transformer). It will be appreciated that the turns ratio on the output transformer depends on the battery voltage at the start and at the end of the discharge cycle.

Lower secondary windings 41a on the transformer 42 (in series with the input voltage) allows the inverter 48 to add its output voltage 50a, 50b and 50c from primary windings 41c to the line voltage during the normal operation of the UPS. This feature allows the UPS to handle line voltage sags (up to 20% of the nominal line voltage) and allows the effects of load non-linearities to be overcome.

The present invention can utilize a control system having a combination of feed-forward and feedback control to provide for such operation. As shown in FIG. 3 for example, the feed-forward signal 110a, 110b to is the difference between the measured voltage at the input terminals 106a, 106b and the desired voltage or reference voltage 108 at these terminals. This signal 110a, 110b is then used to provide the "makeup" voltage command to inverter controller 100 (and to the inverter via 112) to the output of the inverter through the output transformer 42. In one embodiment, this transformer has a 3:1 turns ratio to limit the rms current through the inverter output to ⅓ of the total current (since the output voltage is nominally zero, the lower switch on the inverter is always "on", and is carrying ⅓ of the load current so that a steady state loss of $(i_{max}/3)^2 \text{Rdson}$ is sustained in steady state). The 3:1 turns ratio means that there is a built in gain of 3 in the nominal path. The feedback signal 118a, 118b will cause the voltage to be modified based on the voltage measured at the load 114a, 114b relative to a desired or reference voltage 116 in feedback controller 104.

The feedback feature allows load voltage and current to be used to control the voltage to overcome load nonlinearities to ensure that the power quality at the output is always within specification (independent of the load).

To allow the inverter to handle overvoltages, the inverter 48 absorbs power from the line (for example, the voltage across the inverter is negative and the current is positive so the inverter is operating in the fourth quadrant). This operating mode requires rectifier unit 44 to return power to the line. In an alternative embodiment, the transformer 34 may be configured to step the input voltage down such that when the maximum input voltage occurs from AC source 32, the output 36a, 36b is the nominal 440 V AC. In this case, the rectifier and the inverter are not required to operate in the fourth quadrant to return power.

When the voltage demand is greater than ±20% of the nominal, a faulted operation occurs and the position of switch 40 changes from position 40a to position 40b. When transfer switch 40 is flipped, the power is supplied by rectifier unit 44 (if there is voltage on the line) or the battery 56 (or other energy storage device). Under these operating conditions, the rectifier unit 44 voltage (which for example nominally can be 650 volts DC) will bleed down as power is removed. When the voltage of rectifier unit 44 is less than the voltage of battery 56, battery 56 will automatically connect because the battery charging MOSFET switch 54 will have its intrinsic diode forward biased (MOSFET switch 54 is electrically connected to rectifier unit 44 and inverter 48 through connection 64 while battery 56 is connected to deliver DC voltage to inverter 48 through connection 66). Similarly, the rectifier unit 44 will be disconnected because the rectifier diodes will be back biased when the battery voltage exceeds the line rectified voltage. If, in the course of the discharge, the line power 36a, 36b is restored and the rectifier voltage comes back up, the rectifier unit 44 will automatically be used and the battery 56 will be disconnected.

The battery 56 preferably will not be charged during nominal operation because the MOSFET 54 will be maintained "off" until such time as the battery charging strategy 58 indicates that the battery be charged. As shown in FIG. 3 (and similarly in FIGS. 2A and 2B), when charging controller 58 determines that battery 56 needs to be charged (through connection 62), charging controller 58 communicates with battery charging MOSFET switch 54 (through line 60) and MOSFET switch 54 is turned "on" for charging the battery with a portion of the power from rectifier unit 44.

As discussed above in connection with FIGS. 2A and 2B, it will be appreciated by those skilled in the art that alternative energy storage devices can be substituted for battery 56. For example and while not to be construed as limiting, alternative energy storage devices such as a flywheel, SMES, supercapacitor or the like could be implemented in system 30. When the transfer switch 40 opens (typically in less than a cycle), the power is provided by the battery 56 and the inverter 48. The inverter 48 is being over driven during this period (from the start of the fault until the battery 56 power is drained).

Recovery of the line 36a, 36b (or the use of a back-up generator) will allow transfer switch 40 to be returned to the nominal position (position 40a). In particular, the inverter voltage will be synchronized to the line for a predetermined period of time. When the voltages go through zero, the transfer switch 40 state will be changed from position 40b to position 40a, and the voltage provided by the inverter 48 will revert to the "makeup" mode, i.e. up to 20% of the total power flow.

If the UPS is used when a motor generator is providing power, then frequency shifts greater than 1 cycle will cause the fault condition to be initiated. In this case, there is always voltage available from the rectifier unit and the system will not revert to the battery. When the frequency is recovered, the UPS is switched back to the nominal mode. The system cooling capacity and the inverter are be sized to accommodate these switchings. This can be application dependent since some generators do not have frequency shifts while other generators do have frequency shifts. In addition, when a frequency shift occurs is a function of the loads being supplied by the generator. It will be appreciated by those skilled in the art that alternative embodiments can be made with such criteria taken into account. It will also be appreciated that such alternative embodiments do not depart from the scope of the present invention.

Referring now to FIG. 4, additional details of a transfer switch and transformer connections suitable for use with a three phase AC power source 32 are illustrated. Power source 32 is typically 3 phase AC power. As shown in FIG. 4, transformer 34 includes wye primary windings 34a and delta secondary windings 34b. It will be appreciated that primary windings 34a alternatively may be delta and secondary windings 34b may be wye. Alternatively, both primary windings and secondary windings may be wye or delta.

Rectifier unit 44 includes rectifier 44a, inductor 44b, capacitor 44c and transformer 44d. Rectifier unit may be connected to ground 44e. As illustrated, transformer 44d includes wye primary windings and delta secondary windings. It will be appreciated that the primary windings alternatively may be delta and that the secondary windings may be wye. Alternatively, both primary windings and secondary windings may be wye or delta. In another embodiment, the rectifier transformer 44d may include a wye primary connected to a delta-wye secondary (or a delta primary connected to a delta-wye secondary) such that 12 pulse rectification can be used. It will be appreciated that this can improve the power factor and reduce harmonics. Rectifier 44a may be an active rectifier.

As also shown in FIG. 4, battery 56 (which, as discussed above, is connected to charging controller 58) may be connected to capacitor 56a and inductor 56b. Capacitor 56a and inductor 56b filter noise from rectifier unit 44. AC outputs 50a, 50b and 50c from inverter 48 are connected to delta primary windings 41c of transformer 42. Lower secondary windings 41a and upper secondary windings 41b are wound as shown. The transformer windings are rated consistent with the power throughput of the various components of the system. Lower secondary windings 41a may also be connected to grounded neutral 45, as shown in FIG. 4. It will be appreciated that the feed forward and feedback controls described above in connection with FIGS. 2A, 2B and 3 can be modified by measuring three phase voltage (e.g. by providing corresponding connections 106c, 110c, 114c and 118c for line 36c as described above for lines 36a and 36b) and used with the arrangement shown in FIG. 4. The arrangements provided by the invention accommodates all of the possible transient and steady state line conditions. The present invention allows the use of an inverter to be overdriven without overheating. Thus for example, an inverter having a rating less than 1 MW can be used for transient 1 MW operation. As set forth above, this can be accomplished by cryogenically cooling the inverter (or the inverter and the battery charging MOSFET switches) to predetermined conditions.

The cooling in accordance with the present invention can be accomplished in an environment of about 60 K to 270 K (e.g. using liquid nitrogen or the like as the cooling liquid). Cryogenics relates to the production and maintenance of low temperatures, often using cryogenic fluids such as hydrogen, helium, oxygen, nitrogen, air or methane. Various discussions concerning cryogenic systems can be found in literature. See e.g., Barron, *Cryogenic Systems*, 2d Ed., Oxford University Press (1985); Bell, Jr., *Cryogenic Engineering*, Prentice Hall, Inc. (1963); Vance, *Cryogenic Technology*, John Wiley & Sons, Inc. (1963); and Timmerhaus et al, *Cryogenic Process Engineering*, Plenum Press (1989), all of which are incorporated herein by reference. As discussed above, commonly assigned U.S. Pat. No. 5,347,168 to Russo discloses a high performance, cryogenically cooled circuit. In addition to the improved operational characteristics of the superconducting based components, the diodes and the gating elements such as MOSFETs provide a circuit capable of operating a switching power supply at lower frequency using larger inductor values. In addition, those arrangements disclosed in commonly owned copending U.S. application Ser. No. 08/384,780, filed Feb. 6, 1995 may be suitable for use in the invention. The entire contents of U.S. Pat. No. 5,347,168 and U.S. application Ser. No. 08/384,780 are incorporated herein by reference.

Cooling the inverter (or the inverter and the battery charging electronic switches (e.g. MOSFETs) in accordance with the present invention allows for continuous power to be supplied from the inverter. When the device is cooled at a temperature higher than 77 K (e.g. up to 270 K), the higher temperature requires that additional inverter MOSFETs be used to achieve the same power loss since the on resistance of the inverter FETs rises at the increased temperature. The increased on resistance is compensated by placing a predetermined number of inverter FETs in parallel. Thus, nominally, the inverter board cooled at 77 K can be derated at a higher temperature or the number of boards can be increased to achieve the same power throughput at the same level of loss.

The cooling environment can be maintained at temperatures in the range of 60 K to 270 K. Cooling systems for cryogenic cooling of power conversion electronics are shown in commonly owned and copending U.S. application Ser. No. 08/698,806, filed Aug. 16, 1996, and entitled *Methods and Apparatus for Cooling Systems for Cryogenic Power Conversion Electronics*, the entire contents of which are incorporated herein by reference.

Referring now to FIG. 5, a cooling system 70 suitable for use in accordance with the present invention is illustrated. Cooling system 70 includes an insulated pressure vessel 72, refrigeration apparatus 74 and power electronics 90. Power electronics 90 can include inverter 48. System 70 also includes cooling coils 82, feed through connectors 84 and connections 112, 64/66 and 50a–50c. Alternatively, power electronics 90 can include inverter 48 and battery charging electronic switches 54 (e.g. MOSFETs) When electronic switches 54 are also cooled, it will appreciated that appropriate connections (e.g. 60 and 68) likewise will be connected to additional feed through connectors 84.

Vessel 72 can be a dewar or the like. Liquid cryogen 80 is contained within vessel 72 such that sufficient vapor space 78 is provided. Inverter 48 is cryogenically cooled and maintained at a temperature between 60 K and 270 K in vessel 72 by cooling liquid 80.

Cooling liquid 80 preferably does not exhibit nucleate boiling unless a minimum heat flux is exceeded based on the properties of the cooling liquid. While nucleate boiling may occur, it is desirable to avoid or minimize film boiling. Under normal conditions below the normal boiling point, liquid 80 will act as a thermal convective heat transfer medium for dissipative inverter apparatus 48 and is suitable for use in the systems shown in FIGS. 2–4.

Cryogen 80 is cooled by refrigeration apparatus 74. For example, cooling coils 82 can be provided to cool cryogen 80 in vessel 72. Preferably, cooling coils 82 are finned to increase the surface area for heat transfer from the cryogen to the refrigeration coil. It will be appreciated that alternative configurations for the cooling coils can be employed so long as the desired heat transfer characteristics from the cryogen to the refrigeration coil can occur. As also shown in FIG. 5, coils 82 are connected to refrigeration apparatus 74 as indicated by lines 82a and 82b. In this manner, liquid 80 can be maintained within a temperature range of 60 K to 270 K.

Under some circumstances, liquid 80 may reach a boiling point during operation such that vapor forms in vapor space 78. As further shown in FIG. 5, a portion of the coils 82 is positioned to be above the cryogen surface level 76, i.e. in the vapor space 78. When the system 70 is not in use, liquid 80 may be a gas and vapor thus forms in vapor space 78. During start-up and the like, the portion of coils 82 in vapor space 78 provide cooling of the vapor.

Feed through connectors 84 are connected to inverter 48 in a manner such that power can be provided to and supplied by inverter 48 as discussed above in connection with FIGS. 2A-4. Feed through connectors 84 have pressure seals contained therein to accommodate temperature changes. Such changes can occur for example during shipping or the like. More specifically, when a system 70 is shipped, the cooling liquid (which may operate at cryogenic temperatures) may be in a gaseous state. The pressure seals are configured to accommodate vapors from the cooling liquid or cryogen.

The embodiment shown in FIG. 5 preferably is operated at atmospheric pressure such that cooling liquid 80 exhibits its normal boiling point and heat is transferred primarily by convection and conduction. In this embodiment, liquid cryogen 80 can blanketed by a space of dry nitrogen and sealed at 1 Atm. System 70 may also be operated below atmospheric pressure.

Cryogens suitable for use in system 70 and capable of maintaining the inverter at operating temperatures between 60 K–270 K include, but are not limited to, octafluoropropane (perfluoropropane), decafluoro n-butane (perfluoro n-butane), decafluoro isobutane (perfluoro isobutane), fluoroethane (e.g. between its boiling and melting points), hexafluoropropane, heptafluoropropane (e.g. 1,1,1,2,3,3,3-heptafluoropropane and 1,1,1,2,2,3,3-heptafluoropropane) and isomers and mixtures thereof. Preferably, the liquid cryogen is saturated and completely halogenated such that the formation of hydrogen fluoride (HF) in the event of an electrical arc is minimized. Additional cryogens and cooling systems for cryogenic cooling can be found in commonly owned and copending U.S. application Ser. No. 08/698,806, filed Aug. 16, 1996, and entitled *Methods and Apparatus for Cooing Systems for Cryogenic Power Conversion Electronics*, incorporated herein by reference. For example, the cooling liquid may be a chlorine-free fluorocarbon. The number of carbons in the liquid may range from 2–4. Alternatively, the number of carbons in the cooling liquid may be greater than 4. For example, a 5 carbon cooling liquid such as dodecafluoropentane, dodecafluoro isopentane or mixtures thereof may be suitable for use. Dodecafluoropentane has a boiling point of about 30° C. at 1 atmosphere.

As mentioned above, octafluoropropane ($C_3F_8$) is suitable for use as a cryogen in accordance with the present invention. Octafluoropropane is an inert, dielectric, nonflammable, non-ozone depleting gas which at 1 atmosphere of pressure exhibits a boiling point of 236 K and exhibits a pour point of 90 K. When octafluoropropane is utilized as the cryogen, it is preferred that the operating temperature of the system is at least 100 K. Decafluoro n-butane ($C_4F_{10}$) exhibits similar properties to those of octafluoropropane, but exhibits a boiling point of 271 K and a pour point of 145 K at 1 atmosphere. Octafluoropropane ($C_3F_8$) and decafluoro n-butane ($C_4F_{10}$) are commercially available from 3M under the trade names PF-5030 and PF-5040, respectively. Octafluoropropane ($C_3F_8$) is sometimes referred to as R218 or FC218.

EXAMPLE 1

A 300 kW inverter including a plurality of inverter MOSFET components placed in liquid nitrogen at 77 K provides 300 kW of continuous power. When the inverter is cryogenically cooled with perfluoropropane (PFP) at a temperature of 170 K as discussed above, the higher temperature requires additional inverter MOSFETs to be used to achieve the same power loss since the on resistance of the inverter MOSFETs rises to 100 milliohms at 170 K (from 33 milliohms at 77 K). It is expected that the increased on resistance will be compensated by placing 3 times the number of inverter FETs in parallel and cryogenically cooling the inverter and the inverter MOSFETs. Thus, nominally, the 300 kW inverter board (at 77 K) is derated to 100 kW at 170 K or the number of boards is increased by a factor of 3 to achieve the same power throughput at the same level of loss.

The design of the 300 kW device ensures that the current per inverter FET is less than 10 amps under full load. This translates into a power loss of about 3.3 watts per inverter FET when the temperature is 77 K. If the temperature is increased to 170 K, the loss per inverter FET increases to about 10 watts per inverter FET. At 10 watts per inverter FET with a FET area of 3 square cm, the heat flux is about 3 watts per square cm. This is well removed from the maximum heat flux that can be tolerated in PFP. As a consequence, the existing 300 kW board could be used to provide power conversion at a much higher level as long as the coolant can absorb the power, which means that the time over which the power is delivered may be limited by the cooling power of the refrigeration system.

It is expected that the 300 kW board in this particular example can be operated in PFP at 1 MW for about 3.5 minutes without deleterious consequences. There are at least two reasons this is possible. First, the heat flux from the inverter MOSFETS when operated at three times the power level and at the higher temperature of PFP (170 K) is still below the critical heat flux for film boiling in PFP. Second, the coolant (in this case, the PFP) acts as a thermal sink and absorbs the heat with a small temperature rise. In this Example, it is expected that if the inverter provides 16 kW into the PFP bath, and the refrigeration system removes only 3 kW, then the temperature rise of 2 cubic feet of PFP would only be about 30° C. in 3 minutes when the starting temperature is −120° C. (153 K).

The ability of what would nominally be a 300 KW device to have the short-term power handling capacity of at least 1 MW would thus allow for the manufacture of a UPS with much lower cost (relative to a device that requires at 1 MW rated inverter).

It should be appreciated by those skilled in the art that the specific embodiments disclosed above may readily be utilized as a basis for modifying or designing other methods or structures for carrying out the same purpose of the present invention. For example, 1 MW systems have been discussed herein above for purposes of illustration. It will be appreciated that other systems having different power requirements are within the scope of the present invention. It should also be real by those skilled in the art that such equivalent constructions do not depart from the spirit and scope of the invention as set forth in the appended claims.

What is claimed is:

1. An uninterruptible power supply system, comprising:
   a primary AC power supply;
   an input transformer connected to the primarily AC power supply;
   a transfer switch connected to the input transformer;
   an output transformer connected to the transfer switch and connected to deliver a first portion of the primary AC power supply to a load under predetermined conditions;
   rectification means connected to the input transformer;
   an inverter connected to the rectification means and connected to deliver a second portion of the primary AC power supply to a load through the output transformer under predetermined conditions;
   cooling means for maintaining the inverter within a predetermined temperature range;
   at least one electronic switch connected to the inverter; and
   energy storage means connected to the at least one electronic switch and connected to deliver power to the inverter under predetermined conditions.

2. The uninterruptible power supply system of claim 1, wherein the at least one electronic switch is configured to control the discharging of the energy storage means to the inverter under predetermined conditions.

3. The uninterruptible power supply system of claim 2, wherein the cooling means is configured to cool the at least one electronic switch and the inverter.

4. The uninterruptible power supply system of claim 3, wherein the rectification means includes internal energy storage means.

5. The uninterruptible power supply system of claim 4, wherein the internal energy storage means includes at least one capacitor.

6. The uninterruptible power supply system of claim 3, wherein the rectification means further includes at least one inductor.

7. The uninterruptible power supply system of claim 5 or 6, wherein the at least one electronic switch is at least one MOSFET, at least one IGBT or at least one FREDFET.

8. The uninterruptible power supply system of claim 7, wherein the inverter is a 300 kW inverter.

9. The uninterruptible power supply system of claim 5 or 6, wherein the energy storage means is a battery.

10. The uninterruptible power supply system of claim 5 or 6, wherein the transfer switch is a solid state transfer switch.

11. The uninterruptible power supply system of claim 10, wherein the solid state transfer switch is an IGBT switch.

12. The uninterruptible power supply system of claim 1, wherein the cooling means includes immersing the inverter in a cooling liquid.

13. The uninterruptible power supply system of claim 12, wherein the cooling liquid is nitrogen.

14. The uninterruptible power supply system of claim 13, wherein the liquid nitrogen maintains the inverter at a temperature of about 77 K.

15. The uninterruptible power supply system of claim 1, wherein the cooling means includes a cooling liquid that maintains the inverter at a temperature between 60 K to 270 K.

16. The uninterruptible power supply system of claim 15, wherein the cryogenic liquid is chemically inert.

17. The uninterruptible power supply system of claim 15, wherein the cryogenic liquid is nontoxic.

18. The uninterruptible power supply system of claim 15, wherein the cryogenic liquid is not hazardous to the environment.

19. The uninterruptible power supply system of claim 15, wherein the cryogenic liquid is a dielectric cryogenic liquid.

20. The uninterruptible power supply system of claim 15, wherein the cryogenic liquid is non-flammable.

21. The uninterruptible power supply system of claim 15, wherein the cryogenic liquid is non-ozone deleting.

22. The uninterruptible power supply system of claim 15, wherein the cryogenic liquid is a chlorine-free fluorocarbon or a mixture of chlorine-free fluorocarbons.

23. The uninterruptible power supply system of claim 22, wherein the number of carbons in the fluorocarbon or fluorocarbons is in the range of 2 to 5.

24. The uninterruptible power supply system of claim 22, wherein the fluorocarbon is completely halogenated.

25. The uninterruptible power supply system of claim 22, wherein the fluorocarbon is a fluoroalkane.

26. The uninterruptible power supply system of claim 25, wherein the fluorocarbon is heptafluoropropane.

27. The uninterruptible power supply system of claim 26, wherein the heptafluoropropane is 1,1,1,2,3,3,3-heptafluoropropane.

28. The uninterruptible power supply system of claim 26, wherein the heptafluoropropane is 1,1,1,2,2,3,3-heptafluoropropane.

29. The uninterruptible power supply system of claim 26, wherein the fluoroalkane is completely halogenated.

30. The uninterruptible power supply system of claim 29, wherein the fluoroalkane is octafluoropropane.

31. The uninterruptible power supply system of claim 29, wherein the fluoroalkane is decafluoro n-butane.

32. The uninterruptible power supply system of claim 29, wherein the fluoroalkane is decafluoro isobutane.

33. The uninterruptible power supply system of claim 29, wherein the fluoroalkane is a mixture of fluoroalkanes selected from the group consisting of octafluoropropane, decafluoro n-butane and decafluoro isobutane.

34. The uninterruptible power supply system of claim 29, wherein the fluoroalkane is dodecafluoropentane, isomers of dodecafluoropentane or mixtures thereof.

35. An power supply system, comprising:
a primary AC power supply;
an input transformer connected to the primary AC power supply;
a transfer switch connected to the input transformer;
an output transformer connected to the transfer switch and connected to deliver at a first portion of the primary AC power supply to a load;
rectification means connected to the input transformer, the rectification means including internal energy storage means;
an inverter including a plurality of semiconductor switches, the inverter connected to the rectification means and connected to deliver a second portion of the primary AC power supply to a load through the output transformer, the power provided by the inverter to the load characterized in that transients in the primary AC power supply do not affect the load;
cooling means for maintaining the inverter having the plurality of semiconductor switches at a predetermined temperature;
at least one electronic switch connected to the inverter; and
energy storage means connected to the at least one electronic switch and connected to deliver power to the inverter under predetermined conditions.

36. The power supply system of claim 35, wherein the transfer switch is a solid state transfer switch.

37. The power supply system of claim 36, wherein the solid state transfer switch is an IGBT switch.

38. The power supply system of claim 35, wherein the cooling means includes immersing the inverter in a cooling liquid.

39. The power supply system of claim 38, wherein the cooling liquid is nitrogen.

40. The power supply system of claim 39, wherein the liquid nitrogen maintains the inverter at a temperature of about 77 K.

41. The power supply system of claim 35, wherein the cooling means includes a cooling liquid that maintains the inverter at a temperature between 60 K and 270 K.

42. The power supply system of claim 41, wherein the cooling liquid is chemically inert.

43. The power supply system of claim 41, wherein the cooling liquid is nontoxic.

44. The power supply system of claim 41, wherein the cryogenic liquid is not hazardous to the environment.

45. The power supply system of claim 41, wherein the cooling liquid is a dielectric cryogenic liquid.

46. The power supply system of claim 41, wherein the cooling liquid is nonflammable.

47. The power supply system of claim 41, wherein the cooling liquid is non-ozone deleting.

48. The power supply system of claim 41, wherein the cooling liquid is a chlorine-free fluorocarbon or a mixture of chlorine-free fluorocarbons.

49. The power supply system of claim 48, wherein the number of carbons in the fluorocarbon or fluorocarbons is in the range of 2 to 5.

50. The power supply system of claim 48, wherein the fluorocarbon is completely halogenated.

51. The power supply system of claim 48, wherein the fluorocarbon is a fluoroalkane.

52. The power supply system of claim 51, wherein the fluorocarbon is heptafluoropropane.

53. The power supply system of claim 52, wherein the heptafluoropropane is 1,1,1,2,3,3,3-heptafluoropropane.

54. The power supply system of claim 52, wherein the heptafluoropropane is 1,1,1,2,2,3,3-heptafluoropropane.

55. The power supply system of claim 51, wherein the fluoroalkane is completely halogenated.

56. The power supply system of claim 55, wherein the fluoroalkane is octafluoropropane.

57. The power supply system of claim 55, wherein the fluoroalkane is decafluoro n-butane.

58. The power supply system of claim 55, wherein the fluoroalkane is decafluoro isobutane.

59. The power supply system of claim 55, wherein the fluoroalkane is a mixture of fluoroalkanes selected from the group consisting of octafluoropropane, decafluoro n-butane and decafluoro isobutane.

60. The uninterruptible power supply system of claim 55, wherein the fluoroalkane is dodecafluoropentane, isomers of dodecafluoropentane or mixtures thereof.

61. The uninterruptible power supply system of claim 35, wherein the plurality of semiconductor switches include MOSFETs or IGBTS.

* * * * *

UNITED STATES PATENT AND TRADEMARK OFFICE
CERTIFICATE OF CORRECTION

PATENT NO. : 5,801,937

DATED : September 1, 1998

INVENTOR(S) : Calman Gold and Richard J. Gran

It is certified that error appears in the above-identified patent and that said Letters Patent is hereby corrected as shown below:

Column 7, line 24: please delete "with", and insert --within-- therefor.

Column 7, line 28: please delete "." after "with".

Column 16, line 36: please delete "real"; and insert --realized-- therefor.

Column 16, line 42: please delete "primarily", and insert --primary-- therefor.

Column 17, line 34: please delete "cryogenic", and insert --cooling-- therefor.

Column 17, line 36: please delete "cryogenic", and insert --cooling-- therefor.

Column 17, line 38: please delete "cryogenic", and insert --cooling-- therefor.

Column 17, line 41: please delete "cryogenic", and insert --cooling-- therefor.

Column 17, line 43: please delete "cryogenic", and insert --cooling-- therefor.

Column 17, line 45: please delete "cryogenic", and insert --cooling-- therefor.

Column 17, line 47: please delete "cryogenic", and insert --cooling-- therefor.

Column 18, line 18: please delete "at".

UNITED STATES PATENT AND TRADEMARK OFFICE
CERTIFICATE OF CORRECTION

PATENT NO. : 5,801,937

DATED : September 1, 1998

INVENTOR(S) : Calman Gold and Richard J. Gran

It is certified that error appears in the above-identified patent and that said Letters Patent is hereby corrected as shown below:

Column 18, line 58: please delete "cryogenic", and insert --cooling-- therefor.

Signed and Sealed this

Tenth Day of August, 1999

*Attest:*

Q. TODD DICKINSON

*Attesting Officer*        *Acting Commissioner of Patents and Trademarks*